United States Patent [19]
Bushue et al.

[11] Patent Number: 5,845,190
[45] Date of Patent: Dec. 1, 1998

[54] CABLE ACCESS DEVICE AND METHOD

[75] Inventors: Michael Bushue, Belmont; Anatoly Shteynberg, San Jose; Gilles Vrignaud, Santa Clara, all of Calif.

[73] Assignee: Ericsson Raynet, Menlo Park, Calif.

[21] Appl. No.: 608,166

[22] Filed: Feb. 28, 1996

[51] Int. Cl.$^6$ ...................................................... H04N 7/10
[52] U.S. Cl. .................. 455/3.3; 348/6; 348/12; 455/3.3; 323/282; 363/21; 363/41; 363/47
[58] Field of Search ................................ 323/282; 363/21, 363/41, 97; 455/3.1, 3.2, 3.3, 4.1, 4.2, 5.1, 6.1, 6.2; 348/6, 7, 8, 10, 12, 13

[56] References Cited

U.S. PATENT DOCUMENTS

| | | | |
|---|---|---|---|
| 3,946,159 | 3/1976 | Fay | 455/5.1 |
| 4,885,795 | 12/1989 | Bunting et al. | 455/5.1 |
| 5,345,592 | 9/1994 | Woodmas | 455/3.3 |
| 5,523,781 | 6/1996 | Brusaw | 348/10 X |
| 5,619,404 | 4/1997 | Zak | 363/21 |
| 5,664,002 | 9/1997 | Skinner et al. | 455/3.3 X |

*Primary Examiner*—Nathan J. Flynn
*Attorney, Agent, or Firm*—Lyon & Lyon LLP

[57] ABSTRACT

An access device having an input port for connecting to an upstream section of a coaxial distribution cable and an output port for connecting to a downstream section of a coaxial distribution cable, and provides isolation of an RF communication signal from an AC power signal for access by subscriber network service equipment. The access device also includes power conditioning of the AC signal to provide a DC operating voltage over a separate output to operate the respective subscriber network service equipment.

19 Claims, 4 Drawing Sheets

CABLE ACCESS DEVICE AND METHOD

FIELD OF THE INVENTION

The present invention pertains to the field of communication networks, including methods and apparatus for providing access to communication and electrical power signals carried over a distribution cable.

BACKGROUND OF THE INVENTION

In most modern telecommunication networks, a community of subscribers are connected to a central office switch through a "two-way" distribution network, which may include one or more transmission facilities, e.g., microwave, optical, electrical, etc., and which may utilize both digital baseband and analog transmission protocols.

By way of example, subscribers associated with a particular central office switch may be connected to the switch via a series of remotely located subscriber network units, with each subscriber network unit serving subscribers in a defined local area. Between the central office switch and each subscriber network unit, telecommunication signals are commonly digitized and multiplexed for transport over relatively high bandwidth facilities, e.g., optical fiber, for greater network efficiency. At the subscriber network unit, individual subscriber signals are typically de-multiplexed and terminated on respective "line cards," which generally perform certain functions such as digital-to-analog conversion and power regulation, e.g., for dial tone, ringing, off-hook detection, etc., that were traditionally performed at the central office. The respective line cards are connected to individual subscriber lines, e.g., twisted wire pairs, for transport of the subscriber signals to and from the respective subscriber premise locations. At the subscriber premise location, the subscriber line is normally terminated on a "network interface" device, e.g., in an environmentally secured enclosure mounted on an exterior wall of a house, or in a "telecommunications closet" serving one or more floors of an office building, respectively. In particular, the network interface device is the termination point for connecting the subscriber's telecommunication equipment, e.g., telephone sets and/or computer modems, to the distribution network.

In many, if not all modern video broadcast networks, e.g., a cable television ("CATV") broadcast network, a broadcast communication signal is transmitted "downstream" from a headend broadcast facility to a community of subscribers over a broadcast distribution network. As with the aforedescribed telecommunication distribution network, a CATV broadcast distribution network may include one or more transmission facilities, e.g., optical and/or electrical, and may utilize differing transmission protocols, e.g., analog RF and/or digital baseband. By way of example, an analog RF CATV broadcast signal may be transmitted optically from a headend facility to a series of distributed hub locations, each of which splits (and amplifies) the broadcast signal for further downstream optical transmission over a number of "branch" facilities to a series of remotely located "broadband optical network units" ("BONUs"). At the BONU, the CATV broadcast signal is typically converted from optical to RF electrical transmission and delivered via electrical RF carrier over a coaxial distribution cable to respective subscriber premise locations served by the BONU. A coaxial splitter (or "tap") device can be used to allow the CATV broadcast signal to be provided onto a subscriber coax drop cable, which distributes the broadcast signal to one or more television sets within the respective subscriber premise location.

It has become desirable to be able to reduce the required transmission facilities for telecommunication and video broadcast distribution networks. In particular, it is desirable to be able to combine the delivery of, at least, two-way telecommunication signals along with a CATV broadcast signal for transmission over the same distribution network. For example, "downstream" optical telecommunication signals may be combined with downstream optical CATV broadcast signals at the aforedescribed BONU locations, wherein the signals are modulated as a "composite" electrical RF communication signal for further downstream distribution over a coaxial cable. However, a combined CATV and telecommunication distribution network faces certain design obstacles. For example, network components, such as, e.g., periodic signal amplifiers or the aforedescribed subscriber network units, respectively, require operating power, preferably supplied over the same distribution network as the communication signals. At the same time, for safety reasons, the communication signals must be accessible at the respective subscriber network units, i.e., without the power signal being present.

It is desirable, therefore, to be able to provide an access device for obtaining both RF communication signals and electrical power signal, respectively, from a coaxial distribution cable in a combined CATV and telecommunication network, wherein the obtained signals may thereafter be transmitted over separate lines to respective subscriber equipment facilities. It is further desirable to provide conditioning of the respective power signals into suitable operating voltage supplies for the respective subscriber equipment facilities.

SUMMARY OF THE INVENTION

In a distribution network, the present invention provides an access device for supplying a relatively high frequency RF communication signal and a source of DC operating voltage derived from a relatively low frequency AC power signal for use by one or more network subscribers.

In a preferred embodiment, the access device includes a input port for connecting to an "upstream" section of a coaxial distribution cable carrying an RF communication signal and an AC power signal. A first diplexer circuit isolates the communication signal from the power signal, wherein an RF tap splits the isolated communication signal for transmission over at least first and second internal RF paths. The portion of the communication signal on the first internal RF path is re-combined with the power signal by a second diplexer circuit, wherein the combined signals are then connected to an output port for reinserting onto a "downstream" section of the coaxial distribution cable, i.e., for further downstream transmission. The portion of the communication signal on the second internal RF path is preferably attenuated to a desirable output level and supplied to a respective subscriber network unit.

In accordance with an aspect of the present invention, power converter for deriving a DC operating voltage supply from the isolated AC power signal is provided, wherein the AC power signal is rectified, e.g., by a diode bridge, and used as an input voltage for a flyback converter controlled by a variable duty cycle control circuit directing a transistor switch, e.g., a MOSFET, to periodically connect a primary winding of a transformer with the input voltage. When the switch is ON, current flows through the primary winding and energy is stored by the inductance of the transformer core. When the switch is OFF, the transformer core reverses polarity and energy stored therein is released in the form of current through a secondary winding, which supplies a DC output voltage. A load storage, or "filter" capacitor is provided to maintain the DC output voltage at a constant level, preferably sufficient to withstand momentary drop offs in the input AC power signal. In accordance with a more specific aspect of the present invention, the control circuitry independently adjusts both the duty cycle of the transistor switch and the transformer switching cycle period, respectively, of the power converter, in order to maintain sufficient output power with a single stage conversion; i.e., without requiring an initial input power factor correction.

The access device may also preferably be equipped with one or more auxiliary input/output ports, wherein each auxiliary port may be used for receiving or transmitting, respectively, combined communication and power signals off of or onto, respectively, an "alternate" coaxial distribution cable. A further diplexer circuit is preferably provided for each of the one or more auxiliary port(s) for separating or combining, respectively, the respective incoming or outgoing communication and power signals.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
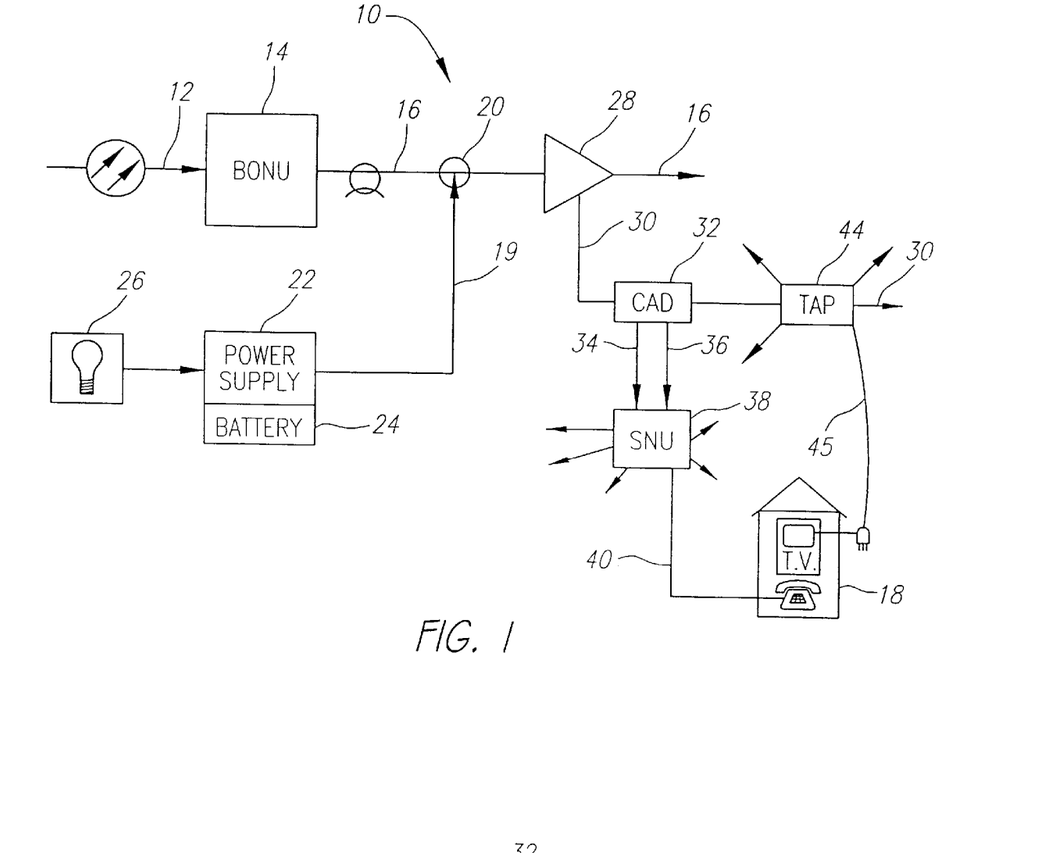
FIG. 1 is a block diagram of an exemplary coaxial distribution network.

Referring to FIG. 1, a broadband distribution network 10 delivers a composite RF communication signal, including both CATV broadcast and telecommunication signals, respectively, over an optical fiber 12 to a broadband optical network unit ("BONU") 14. At the BONU 14, the composite RF communication signal is converted from optical to RF electrical transmission and transmitted onto a main coaxial distribution cable 16 for delivery to a plurality of subscriber premise locations 18 served by the BONU 14. A low frequency AC power signal, e.g., 50 to 60 volts AC in preferred embodiments, is also transmitted onto the distribution cable 16 from a power supply line 19 by a power inserter 20, in order to supply power to the various network components connected to the distribution cable 16, including, e.g., the BONU 14, and various downstream amplifiers. A power supply module 22, preferably including a back-up battery system 24, respectively, supplies the AC power signal onto power line 19. In turn, the power supply module 22 is supplied by a power source 26, such as, e.g., a local power utility. The back-up battery system 24 is preferably sufficient to maintain the AC power signal over the coaxial distribution cable 16 for prolonged periods of time whenever the source 26 fails or is temporarily interrupted. It should be noted, however, that even with the back-up battery system 24 in place, a momentary loss of the AC power signal (e.g., up to a full cycle) will likely occur during a switch-over from the source 26 to the back-up system 24, e.g., for approximately 15 ms in typical power supply systems for CATV broadcast networks. Such momentary voltage losses may also occur due to measures taken at the supply module 22 to protect from transients or surges over the distribution cable 16.

The distribution cable 16 passes through one or more amplifiers 28, wherein the RF communication signal is amplified and split onto one or more coaxial feeder cables 30. The AC power signal is diverted within the amplifier 28, e.g., by means of a diplexer circuit (not shown), so that the RF communication signal can be amplified. The AC power signal is then recombined with the RF communication signal on the (downstream side of) distribution cable 16, as well as on each of the coaxial feeder cables 30, respectively, after the RF signal is amplified. A plurality of coaxial cable access devices ("CADs") 32 are interposed along each feeder coaxial cable 30. In a manner described in greater detail herein, each CAD 32 isolates the RF communication signal from the AC power signal and splits off a portion of the RF signal for transport to a respective subscriber network unit 38 by way of a coaxial RF access line 34. The subscriber network units 38 each include circuitry for deriving one or more telecommunication subscriber channels from the RF communication signal, e.g., voice and/or data channels, for delivery over respective subscriber lines 40 to a plurality of subscriber premise locations 18 served by the respective subscriber network unit 38. For example, in a combined CATV broadcast and telecommunication distribution network employed by the assignee of the present invention, up to thirty-two subscriber lines 40 may preferably be connected to a single subscriber network unit 38.

Each CAD 32 also includes power conditioning circuitry for converting the AC power signal to a DC operating voltage supply, e.g. −115 to −130 volts DC in preferred embodiments, for transmission over a separate access line e.g., a twisted wire pair 36, to the respective subscriber network unit 38. By preferably providing the RF communication signal and DC operating voltage supply over separate access lines, 34 and 36, respectively, from the CAD 32 to the respective subscriber network unit 38, the CAD 32 advantageously allows for the RF communication equipment (not shown) in the subscriber network unit 38 to be safely handled, e.g, by a service technician.

A plurality of conventional tap devices 44 may also be provided along each feeder cable 30, wherein each tap 44 also isolates and splits off the RF communication signal, respectively, for transmission over one or more subscriber CATV coaxial drop cables 45.

Figure 2:
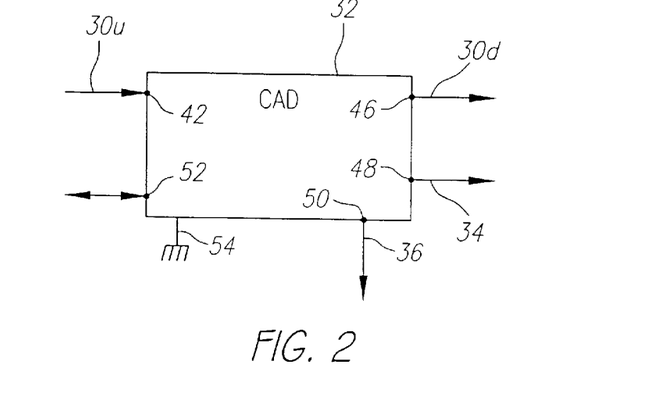
FIG. 2 is a block diagram depicting functional inputs and outputs of an exemplary cable access device, in accordance with the present invention.

Referring to FIG. 2, the CAD 32 includes an input port 42 for receiving the respective RF communication and AC power signals off of an upstream portion 30u of coaxial feeder cable 30, and an output port 46 for re-inserting the respective signals back onto a downstream portion 30d of cable 30, respectively, for further downstream distribution. In a manner described below, an RF output port 48 provides the RF communication signal for transport over coax access cable 34, and a power supply output port 50 provides a (converted) DC operating voltage for transport over twisted pair 36, respectively. An auxiliary port 52 is also provided, wherein the auxiliary port may be used as an alternate input port to port 42 for receiving the respective communication and power signals into the CAD 32, e.g., from an alternate ("upstream") distribution cable (not shown). The auxiliary port 52 may also be used as an alternate output port to port 46 for re-inserting the respective signals from the CAD 32, e.g., onto an alternate ("downstream") distribution cable (also not shown), respectively. An electrical ground connection 54 is also provided from the CAD 32.

Figure 3:
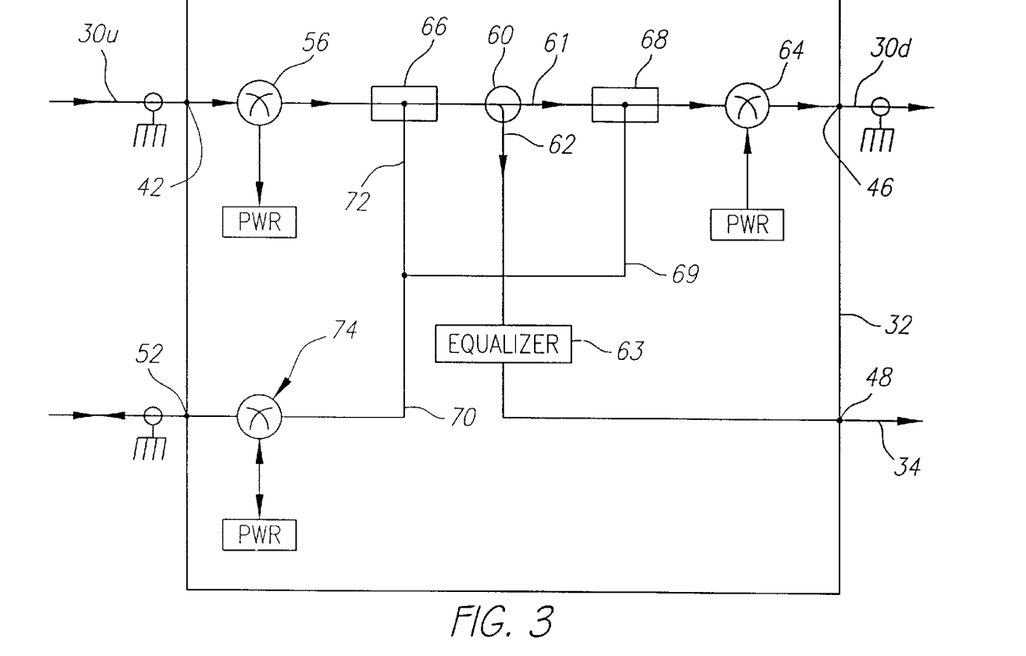
FIG. 3 is a block diagram depicting RF signal paths in an exemplary cable access device, in accordance with the present invention.

Referring to FIG. 3, the respective RF communication and AC power signals are received off the upstream portion 30*u* of feeder cable 30 through input port 42, wherein a first diplexer circuit 56 isolates the AC power signal from the RF communication signal. The isolated RF communication signal is then passed through a tap 60, which splits the signal for transmission over both a first internal RF path 61 and a second internal RF path 62, respectively. The portion of the RF communication signal transported over the first internal RF path 61 is passed through a second diplexer circuit 64, where it is re-combined with the AC power signal, and connected to output port 46 for insertion onto the downstream portion 30*d* of the coax feeder cable 30. The portion of the RF communication signal transported over the second internal RF path 62 is preferably passed through an equalizer circuit 63 for balance and power level attenuation, respectively, and then transmitted through RF output port 48 to the respective subscriber network unit 38.

A pair of auxiliary configuration switches 66 and 68 are preferably provided, which may be alternately configured to employ the auxiliary input/output port 52. In particular, a third diplexer circuit 74 is provided to either separate, or re-combine, respectively, an AC power signal from/to a respective RF communication signal received through, or transmitted from, respectively, auxiliary port 52. For example, when using (main) input port 42, switch 66 is positioned to connect diplexer 56 to tap 60, (as shown in FIG. 3). Alternately, when using auxiliary port 52 as the input port, (i.e., instead of port 42), switch 66 is positioned to connect diplexer 74 to tap 60, via internal paths 70 and 72, respectively. Likewise, when using (main) output port 46, switch 68 is positioned (as shown in FIG. 3) to connect the first internal RF path 61 to diplexer 64, whereas when using auxiliary port 52 as the output port, switch 68 is positioned to connect diplexer 74 to the first internal RF path 61, via internal paths 69 and 70, respectively. It should be noted that the illustrated preferred embodiment is merely exemplary of the possible alternative input and output port configurations that are possible within the CAD 32. By way of example only, with the teaching provided herein, one skilled in the art could employ internal switch configurations supporting multiple input and output ports, respectively, depending on a desired distribution network flexibility.

Figure 4:
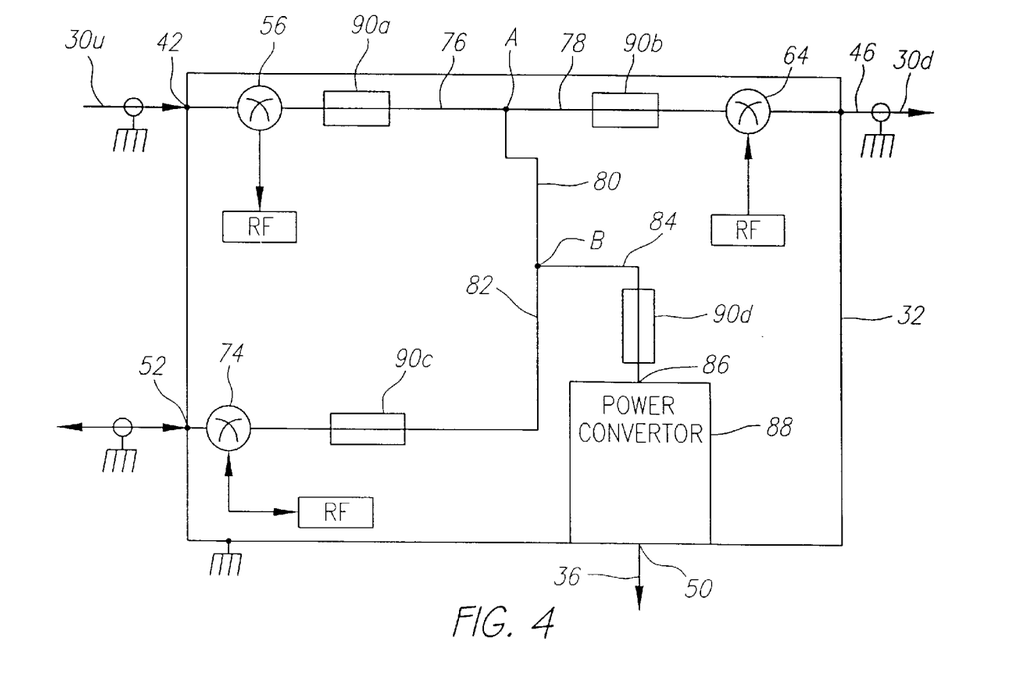
FIG. 4 is a block diagram depicting power signal paths in an exemplary cable access device, in accordance with the present invention.

Referring to FIG. 4, an internal power bus arrangement comprises a first node "A" and a second node "B", which connect power bus paths 76, 78, 80, 82 and 84, respectively. In this manner, the "power side" connections of respective diplexer circuits 56, 64 and 74, respectively, may be electrically connected. In particular, the AC power signal may preferably be throughput from a selected input port to a selected output port, regardless of whether the aforedescribed input/output port configuration is 42/46, 42/52, or 52/46, respectively. For example, in the illustrated preferred embodiment, the isolated AC signal may be transmitted from port 42 to port 46, via paths 76 and 78; from port 42 to port 52, via paths 76, 80 and 82; or from port 52 to port 46 via paths 82, 80 and 78, respectively. The isolated AC power signal is also preferably supplied, via node "B" and path 84, respectively, as an input voltage 86 to a power converter 88. The power converter 88 converts (or "conditions") the AC input signal 86 into a DC operating voltage supply, which is output through power supply output port 50 onto access line 36, respectively, for use by a respective subscriber network unit 38. For purposes of surge protection and selective power routing within the CAD 32, fuses 90*a–d* are preferably interposed along the respective power bus paths 76, 78, 82 and 84.

Figure 5:
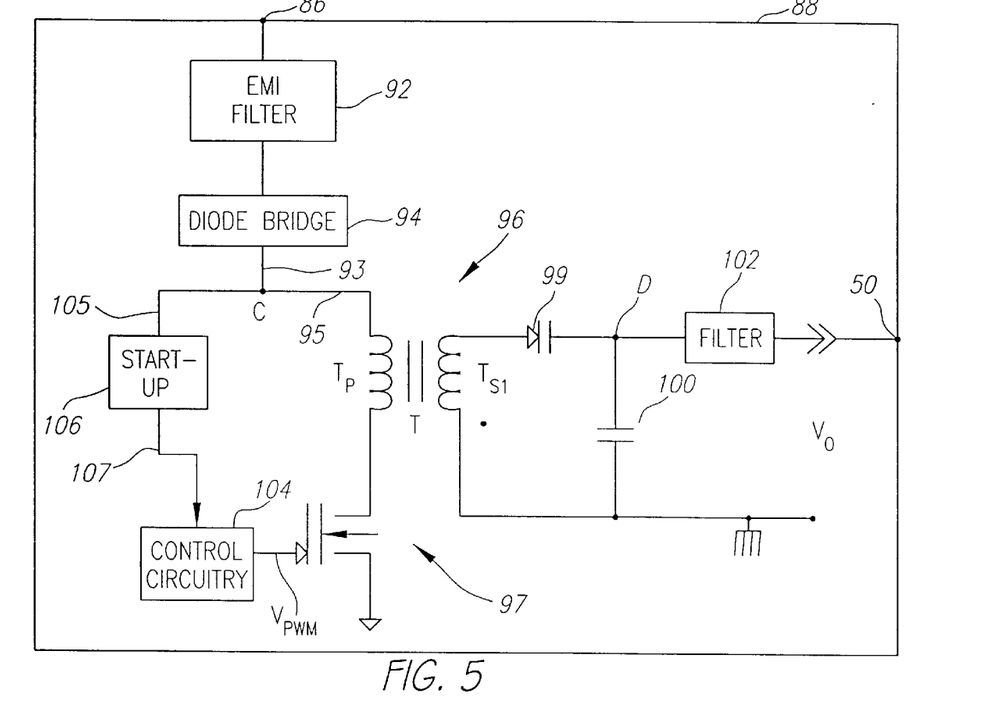
FIG. 5 is a block diagram of a preferred power converter in an exemplary cable access device, depicting a power conversion power stage in accordance with the present invention.

Referring to FIG. 5, the AC input power signal 86 is passed through an electro-magnetic interference (EMI) noise filter 92 and rectified to a "DC" signal 93, by a diode bridge 94. The rectified "DC" voltage 93 is then supplied, by way of node "C", as an input voltage 95 for a flyback converter circuit, which includes a transformer 96 having a primary winding $T_p$, a transformer core T and a secondary winding $T_s$, respectively. To operate the converter, a transistor switch 97, e.g., a MOSFET, is provided to periodically connect the input voltage 95 through the primary winding $T_p$. The switch 97 is alternately caused to be turned ON and OFF by a PWM voltage control signal, $V_{pwm}$, which is supplied by converter control circuitry 104.

In particular, when $V_{pwm}$ is "high", the switch 97 is turned ON, current flows through the primary winding $T_p$ and energy is stored by the inductance of the transformer core T, respectively. When $V_{pwm}$ is "low", the switch 97 is turned OFF, the transformer core T reverses polarity and stored energy is released in the form of a current through the secondary winding $T_s$. The released current through $T_s$ causes a secondary rectifying diode 99 to forward bias, resulting in an output voltage $V_o$ supplied across the power supply output port 50, as determined by the selected turns ratio of the respective transformer windings, $T_p/T_s$, respectively. The output voltage $V_o$ supplied by the direct current released through the secondary winding $T_s$ is preferably regulated by a filter circuit 102.

A load storage, or "hold-up" capacitor 100 is also preferably provided, by way of a node "D", after rectifying diode 99, respectively, to maintain the output voltage $V_o$ at a constant level between power transfer cycles of the transformer 96. When the load storage capacitor 100 is sufficiently charged by the secondary current flow, the rectifying diode 99 reverses bias and the capacitor 100 discharges current at a steady rate through filter 102 and output port 50, respectively, thereby maintaining a constant supply for $V_o$ until the next transformer transfer cycle. By preferably selecting a sufficiently large capacitor 100, the DC output voltage $V_o$ is advantageously maintained even if the AC input voltage 86 is momentarily interrupted.

In the illustrated preferred embodiment, the rectified ("DC") voltage at node "C" is also supplied, via path 105, to a "start-up" regulating circuit 106, which provides an initial operating voltage 107 for the control circuitry 104; i.e., for when the respective CAD 32 is first inserted along the coax feeder cable 30. For example, in a preferred embodiment, the start-up circuit 106 includes a holding capacitor (not-shown) connected to path 105. When the holding capacitor is sufficiently charged by the rectified "DC" voltage over path 105, (i.e., from the diode bridge 94), it will discharge a uniform threshold voltage 107 to the control circuitry 104. Once the converter operation commences, operating (or "control") voltage for the control circuitry 104 is thereafter preferably provided by an auxiliary output of the transformer 96.

Figure 6:
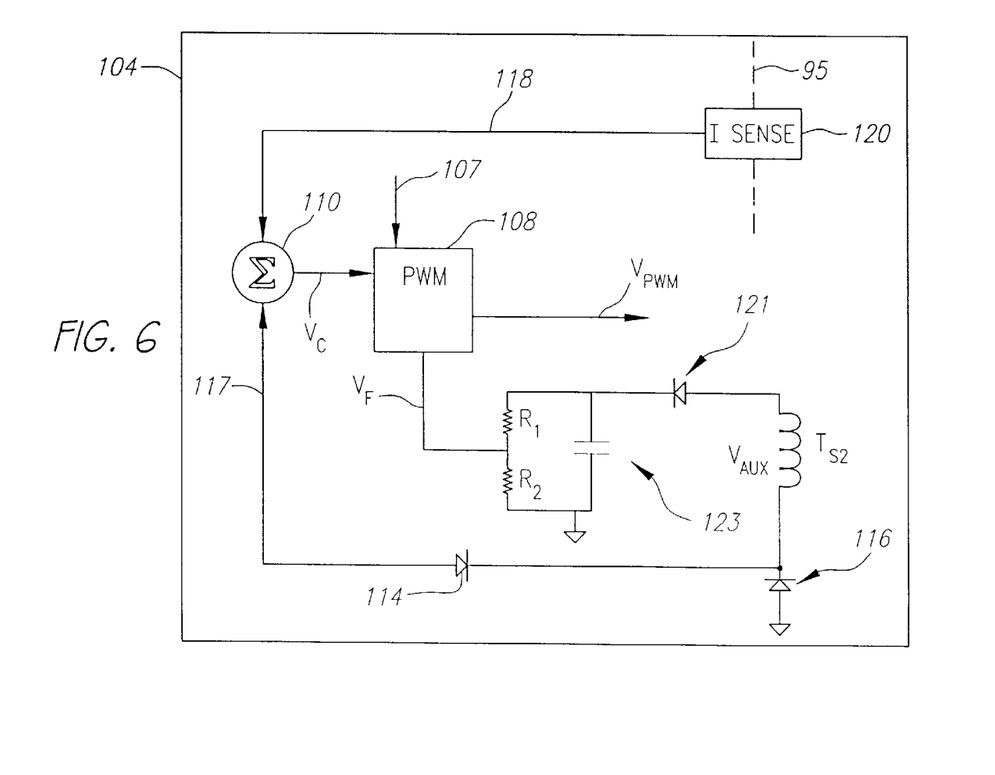
FIG. 6 is a block diagram of control circuitry for the power converter of FIG. 5.
Figure 7:
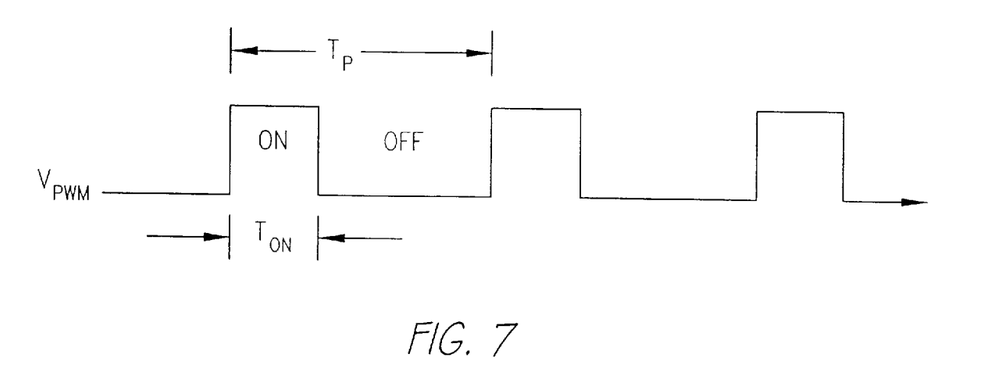
FIG. 7 depicts the period and duty cycle of a voltage signal, $V_{pwm}$, for controlling the switching cycle of the power converter of FIG. 5.

Referring to FIG. 6, the control circuitry 104 for the power converter 88 includes a PWM controller 108, which outputs the PWM voltage control signal $V_{pwm}$ to operate the switch 97. When $V_{pwm}$ is at "high" voltage, switch 97 is turned ON, causing current to be drawn through the primary winding $T_p$ and energy stored in the core T, respectively, of transformer 96. Conversely, when $V_{pwm}$ is at a "low" voltage, switch 97 turns OFF and the energy stored in the transformer core T begins to transfer through the secondary winding $T_s$, to supply the output voltage $V_o$. In preferred embodiments, the characteristics of the PWM controller 108 are selected so that both the transfer cycle period, i.e., the period time elapsing during each full energy transfer cycle of the transformer 96, "$t_p$" in FIG. 7, and the duty cycle, i.e., the duration of time the signal is in a "high" voltage state during each charging portion of an energy transfer cycle, "$t_{ON}$" in FIG. 7, respectively, of the voltage signal control $V_{pwm}$, are independently controlled.

In the illustrated preferred embodiment, the PWM controller 108 is controlled by a pair of independent input signals: a transfer cycle period control voltage, $V_c$, and a duty cycle feedback control voltage, $V_f$, respectively. In particular, the PWM controller 108 "resets" control signal $V_{pwm}$, i.e., begins a new transfer cycle period $t_p$, by setting $V_{pwm}$ to "high" whenever $V_c$ reaches a zero voltage level. The PWM controller 108 will then maintain $V_{pwm}$ in a "high" state for the duration of duty cycle to $_{ON}$. Independent of the transfer cycle "reset" control signal $V_c$, the PWM controller 108 will either increase or decrease the duty cycle $t_{ON}$ in response to a corresponding decrease or increase, respectively, in the voltage level of $V_f$; i.e., wherein the duty cycle $t_{ON}$ of $V_{pwm}$ is inversely proportional to the voltage level of $V_f$. Thus, operation of the control circuitry 104 is achieved as follows:

An auxiliary secondary winding $T_{s2}$ of the transformer 96 supplies an auxiliary output voltage $V_{aux}$, by which the "main" output voltage $V_o$ can be measured; i.e., by way of calculating from the selected turns ratio between secondary windings $T_s$ and $T_{s2}$, respectively.

In accordance with a first aspect of the present invention, during each transfer of energy to the secondary, (i.e., when the switch 97 is turned OFF), current is passed through secondary winding $T_{s2}$ which causes a feedback rectifying diode 121 to forward bias, wherein the current is stored in a feedback holding capacitor 123, respectively. The (regulated) current discharged from the feedback capacitor 123 passes through a resistor bridge $R_1$, $R_2$, thereby generating the duty cycle feedback voltage $V_f$. In particular, the values of the resistors $R_1$ and $R_2$, respectively are preferably selected so that the resulting feedback voltage $V_f$ will correspond approximately to a desired main output voltage $V_o$. Thus, if the main output voltage level $V_o$ of the transformer 96 increases, (e.g., due to a decrease in the load across output port 50), the auxiliary output voltage $V_{aux}$ will cause corresponding increase in $V_f$. This, in turn, will cause the PWM controller 108 to decrease the duty cycle $t_{ON}$ of $V_{pwm}$, thereby resulting in a corresponding decrease in the main output voltage $V_o$ of the transformer 96, i.e., due to the reduction in the amount of energy stored in, and released from, the transformer core T during each energy transfer cycle. The converse situation is also true; i.e., if the main output voltage $V_o$ of the transformer 96 decreases, (e.g., due to an increase in the load across port 50), the auxiliary output voltage $V_{aux}$ will cause corresponding decrease in $V_f$, which, in turn, will cause the PWM controller 108 to increase the duty cycle $t_{ON}$ of $V_{pwm}$, thereby causing more energy to be stored in, and released from, respectively, the transformer core T during each energy transfer cycle. This, in turn, will thereby increase the main output voltage level $V_o$ of the transformer 96.

In accordance with a second aspect of the present invention, at the beginning of each new transfer cycle period $t_p$, i.e., when $V_{pwm}$ is set to "high" and switch 97 thereby turned ON, current drawn through the primary winding $T_p$ is sensed by a current sensor circuit 120 interposed along input power path 95. As current is drawn into the primary winding $T_p$, the current sensor emits a corresponding, (i.e., "ramp-up") current over a path 118, thereby creating a non-zero voltage on 118, which is summed at a node 110 with voltage over a second path 117 to form the transfer cycle period control voltage $V_c$. Thus, so long as the current flows through the primary winding $T_p$, control voltage $V_c$ is non-zero, and the PWM controller 108 will not reset the transfer cycle period $t_p$.

When the switch 97 is turned OFF, (i.e., at the expiration of the current duty cycle $t_{ON}$, as regulated by $V_f$), the current (and voltage) over path 118 falls (rapidly) to zero. However, current passing through the auxiliary secondary winding $T_{s2}$ creates a (slight) voltage differential over path 117, between a pair of reverse-bias rectifying diodes 114 and 116, respectively, so that the control voltage $V_c$ through summing node 110 remains non-zero until the transfer current is completely discharged through $T_{s2}$; i.e., and $V_{aux}$ falls to zero. At that instant, $V_c$ also falls to zero, thereby causing the PWM controller 108 to begin a new energy transfer cycle period $t_p$ by resetting $V_{pwm}$ to "high" and turning ON switch 97. By preferably selecting diodes 114 and 116 to have substantially identical characteristics, the voltage differential over path 117 is advantageously slight, e.g., equivalent to a high impedance input to the summing node 110, and detection of the instant when the current has completely discharged through $T_{s2}$ is relatively precise. In this manner, the energy transfer cycle period will advantageously closely track any changes in the output load, i.e., which will cause the amount of current drawn through the primary winding $T_p$ over a fixed period of time to increase.

In order to prevent the current drawn through the primary winding $T_p$ from saturating the transformer 96, the current sensing circuit 120 preferably detects when the current level is approaching a threshold level and causes the PWM controller to switch $V_{pwm}$ to a "low" state, and turn OFF switch 97, respectively.

As can be observed, by way of the advantageous control circuitry 104, the DC output voltage $V_o$ may be maintained without overworking (i.e., distorting) the AC input signal back over the respective distribution cables 16 and 30. In particular, the duty cycle $t_{ON}$ of $V_{pwm}$ and, thus, the ON time of switch 97, is varied gradually over a frequency period of the AC input power signal 86. In other words, if the output voltage $V_o$ is low, the changes in the duty cycle $t_{ON}$ will be increased proportionately until the average (i.e., target) output voltage level is achieved, and visa-versa.

Yet another advantage of this innovative applied topology is that the AC/DC power conditioning from the AC input 86 to the DC output 50 is accomplished in a single stage conversion, i.e., without requiring an initial input power factor correction. Because the RF communication signal has been removed by a respective diplexer circuit, (e.g., 56 or 74, respectively, in the illustrated preferred embodiment), the transformer 96 may also advantageously provide voltage referencing with respect to the AC power input signal 86.

Thus, a new and useful access coaxial access device for providing access to a high frequency RF communication signal and a source of operating voltage derived from a low frequency power signal, respectively, carried on a single coaxial distribution cable in a broadband communications network has been disclosed. While embodiments and applications of this invention have been shown and described, as would be apparent to those skilled in the art, many more modifications and applications are possible without departing from the inventive concepts herein.

For example, in an alternate preferred embodiment, (not illustrated), the distribution network 10 may include a subscriber network interface facility ("SNIF") at each subscriber premise location 18, wherein the SNIF replaces the function of both the subscriber network unit 38 and the tap 44 of the illustrated embodiment; i.e., wherein the SNIF provides both telecommunication and CATV broadcast signals from the RF cable 34 to the respective subscriber premise location. With this alternate preferred embodiment, a respective CAD 32 would provide separate RF communication 34 and DC voltage 36 lines, respectively, to respective SNIF locations, i.e., instead of respective subscriber network units. An implementation of a subscriber network interface facility in accordance with such an embodiment is disclosed and described in U.S. patent application Ser. No. 08/608,436 filed Feb. 28, 1996, now U.S. Pat. No. 5,805,591, entitled "Subscriber Network Interface Facility", filed on the same date and assigned to the same assignees, respectively, as the present application, and which is fully incorporated herein by reference.

The scope of the disclosed inventions, therefore, are not to be restricted except in the spirit of the appended claims.

What is claimed:

1. An access device, comprising:
   an input port comprising means for connecting to a first portion of a coaxial cable;
   an output port comprising means for connecting to a second portion of said coaxial cable;
   means for isolating an AC power signal from an RF signal;
   a transformer for deriving a DC voltage from said isolated AC power signal, said transformer comprising a primary winding and a secondary winding; and
   transformer control circuitry comprising
      a switch, said switch alternately connecting or disconnecting said primary winding to a current source,
      means for generating a switch control signal, said switch control signal having an independent duty cycle and transfer cycle period, respectively,
      duty cycle control circuitry comprising means for increasing said duty cycle in response to a decrease in said DC voltage, and decreasing said duty cycle in response to an increase in said DC voltage, and
      transformer reset circuitry comprising means for initiating an energy transfer cycle across said transformer in response to detecting the end of a previous energy transfer cycle.

2. The access device of claim 1, further comprising means for splitting said isolated RF signal onto first and second internal RF paths.

3. The access device of claim 2, further comprising means for combining the portion of said isolated RF signal on said first internal RF path with said isolated AC power signal, and for outputting said combined signals through said output port.

4. The access device of claim 2, further comprising an RF output port connected to said second internal RF path.

5. The access device of claim 1, further comprising a DC power supply port connected to said secondary winding.

6. The access device of claim 1, wherein said means for isolating said AC power signal from the communication signal comprise a diplexer circuit.

7. The access device of claim 1, further comprising an auxiliary port and means for selectively allow electrical and RF connection between said auxiliary port and said input port or said output port, respectively.

8. The access device of claim 1, said duty cycle control circuitry further comprising means for generating a feedback voltage corresponding to said DC voltage.

9. The access device of claim 1, said transformer reset circuitry further comprising an auxiliary transformer secondary winding, wherein said means for initiating an energy transfer cycle comprise a voltage control signal derived by summing a first voltage generated by current flowing through said primary winding with a second voltage generated by a current flowing through said auxiliary secondary winding, respectively.

10. The access device of claim 1, wherein said transformer control circuitry further comprises a current saturation sensor, said sensor having means for interrupting said duty cycle upon detection of a threshold current level flowing through said primary winding.

11. In a broadband distribution network transporting a relatively high frequency RF signal and a relatively low frequency AC power signal, respectively, over a coaxial cable, an access device, comprising:
   an input port comprising means for connecting to a first portion of the coaxial cable;
   an output port comprising means for connecting to a second portion of the coaxial cable;
   diplexer circuitry for isolating the AC power signal from the RF signal;
   means for splitting the RF signal onto a first internal RF path and a second RF internal path, respectively;
   an RF output port connected to said second internal RF path;
   a transformer for supplying a DC voltage derived from the isolated AC power signal, said transformer comprising a primary winding and a secondary winding;
   a DC power port connected to said secondary winding; and
   transformer control circuitry comprising
      a switch, said switch alternately connecting or disconnecting said primary winding to a current source,
      means for generating a switch control signal, said switch control signal having an independent duty cycle and transfer cycle period, respectively,
      duty cycle control circuitry comprising means for increasing said duty cycle in response to a decrease in said DC voltage, and decreasing said duty cycle in response to an increase in said DC voltage, and
      transformer reset circuitry comprising means for initiating an energy transfer cycle across said transformer in response to detecting the end of a previous energy transfer cycle.

12. The access device of claim 11, said transformer reset circuitry further comprising an auxiliary transformer secondary winding.

13. The access device of claim 12, wherein said means for initiating an energy transfer cycle comprise a voltage control signal derived by summing a first voltage generated by current flowing through said primary winding with a second voltage generated by a current flowing through said auxiliary secondary winding, respectively.

14. The access device of claim 11, wherein said transformer control circuitry further comprises a current saturation sensor, said sensor having means for interrupting said duty cycle upon detection of a threshold current level flowing through said primary winding.

15. The access device of claim 11, further comprising an auxiliary port and means for selectively allow electrical and RF connection between said auxiliary port and said input port or said output port, respectively.

16. A coaxial cable access device, comprising:
   circuitry for isolating an AC power signal from an RF signal carried over a coaxial cable;
   a transformer for deriving a DC voltage from the isolated AC power signal, said transformer having a primary winding and a secondary winding; and
   transformer control circuitry comprising
      a switch, said switch alternately connecting or disconnecting said primary winding to a current source,
      means for generating a switch control signal, said switch control signal having an independent duty cycle and transfer cycle period, respectively,
      duty cycle control circuitry comprising means for increasing said duty cycle in response to a decrease in said DC voltage, and decreasing said duty cycle in response to an increase in said DC voltage, and
      transformer reset circuitry comprising means for initiating an energy transfer cycle across said transformer in response to detecting the end of a previous energy transfer cycle.

17. The access device of claim 16, said transformer reset circuitry further comprising an auxiliary transformer secondary winding.

18. The access device of claim 17, wherein said means for initiating an energy transfer cycle comprise a voltage control signal derived by summing a first voltage generated by current flowing through said primary winding with a second voltage generated by a current flowing through said auxiliary secondary winding, respectively.

19. The access device of claim 17, wherein said transformer control circuitry further comprises a current saturation sensor, said sensor having means for interrupting said duty cycle upon detection of a threshold current level flowing through said primary winding.

* * * * *